US00RE35635E

United States Patent [19]

Bauman

[11] E Patent Number: Re. 35,635

[45] Reissued Date of Patent: Oct. 21, 1997

[54] ADJUSTABLE CASEMENT HINGE

[75] Inventor: Leonard P. Bauman, Byron, Minn.

[73] Assignee: Truth Hardware Corporation, Owatonna, Minn.

[21] Appl. No.: 637,533

[22] Filed: Apr. 25, 1996

Related U.S. Patent Documents

Reissue of:

[64] Patent No.: 5,307,539
Issued: May 3, 1994
Appl. No.: 831,882
Filed: Feb. 6, 1992

[51] Int. Cl.[6] ..... E05D 5/12; E05D 15/30

[52] U.S. Cl. ..... 16/239; 16/235; 16/DIG. 34; 49/252; 49/396

[58] Field of Search ..... 16/235, 242, DIG. 34, 16/DIG. 39, 239, 241; 49/252, 396

[56] References Cited

U.S. PATENT DOCUMENTS

| | | | |
|---|---|---|---|
| Re. 32,846 | 1/1989 | Sandberg et al. | 16/381 |
| 1,336,174 | 4/1920 | Way | 16/242 |
| 1,499,540 | 7/1924 | Lea . | |
| 1,710,171 | 4/1929 | Lindsay . | |
| 2,688,779 | 9/1954 | Westman | 49/252 |
| 2,926,397 | 3/1960 | Vuncannon . | |
| 2,994,907 | 8/1961 | Hammond | 16/370 |
| 4,674,149 | 6/1987 | Vetter | 16/341 |
| 4,726,092 | 2/1988 | Tacheny et al. | 16/364 |
| 4,790,106 | 12/1988 | La See | 49/252 |
| 4,833,754 | 5/1989 | Yang | 49/252 |
| 4,986,028 | 1/1991 | Schneider | 49/252 |
| 5,074,075 | 12/1991 | La See | 49/252 |
| 5,152,102 | 10/1992 | La See | 49/252 |

FOREIGN PATENT DOCUMENTS

| | | | |
|---|---|---|---|
| 376488 | 7/1932 | United Kingdom | 16/241 |
| 1137878 | 12/1968 | United Kingdom | 16/241 |

*Primary Examiner*—Chuck Y. Mah
*Assistant Examiner*—Donald M. Gurley
*Attorney, Agent, or Firm*—Wood, Phillips, VanSanten, Clark & Mortimer

[57] ABSTRACT

A connection for adjustably holding two window hardware members in pivotally connected relationship, including a first hardware member with a first cylindrical opening, a second hardware member with a second cylindrical opening, and a stud. The stud has a flange having two substantially parallel faces and a peripheral surface therebetween, with a rivet portion projecting from one face and a pivot portion projecting from the other face. The rivet portion includes a cylindrical neck extending through the first cylindrical opening and a head on the end of the neck, the flange and the head engaging opposite sides of the first hardware member to frictionally secure the stud against freely pivoting relative to the track. The pivot portion includes a cylindrical shaft eccentric from the cylindrical neck and extending through the second cylindrical opening. A C-ring is disposed in an external peripheral groove in the pivot portion to secure the second hardware member thereto for pivoting about the cylindrical shaft. A part of the C-ring is in the peripheral groove and a part extends radially beyond the pivot portion periphery when the C-ring is in a securing position. The peripheral groove has a depth to enable deformation of the C-ring by movement of the spaced-apart ends towards each other to a release position in which substantially all of the C-ring is in the peripheral groove. The stud flange peripheral surface is engageable with a tool to allow for adjustment of the pivotal connection by pivoting the stud.

16 Claims, 1 Drawing Sheet

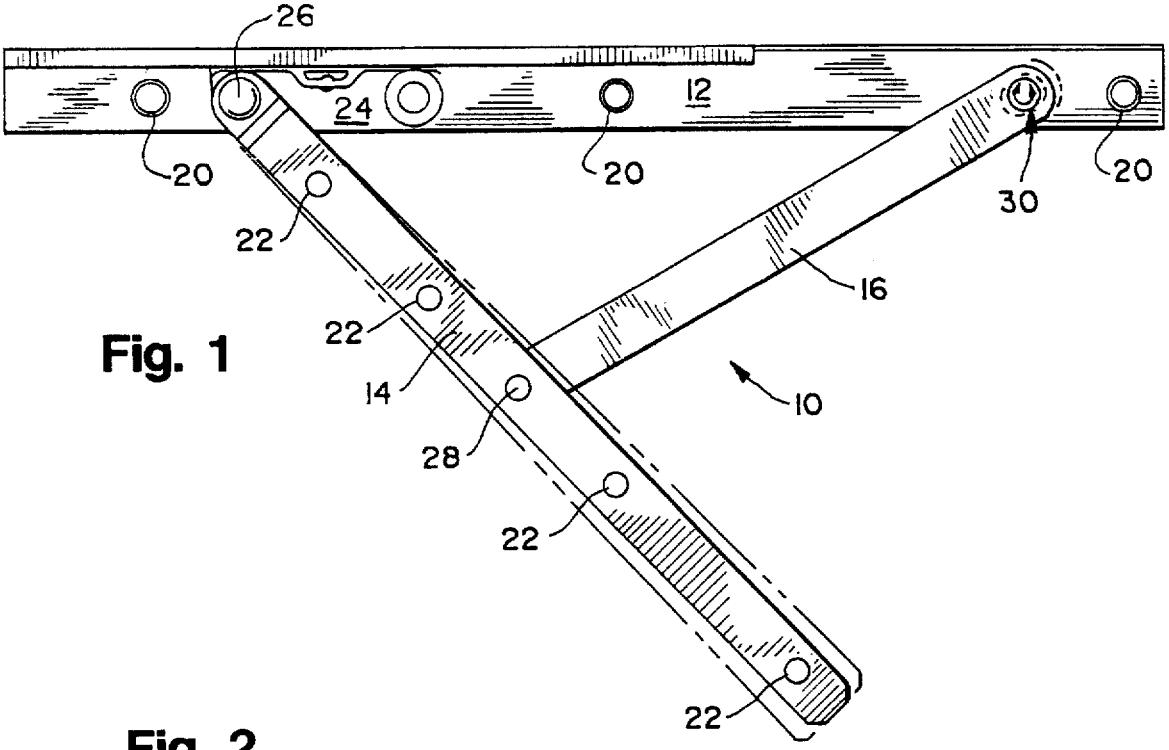
Fig. 1
Fig. 2
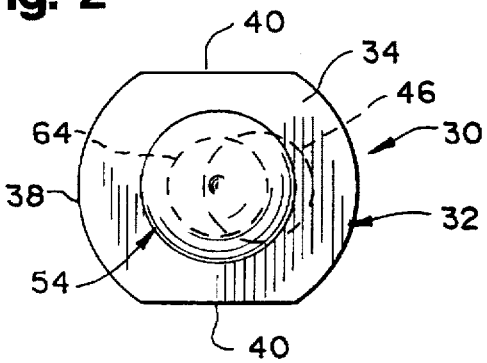
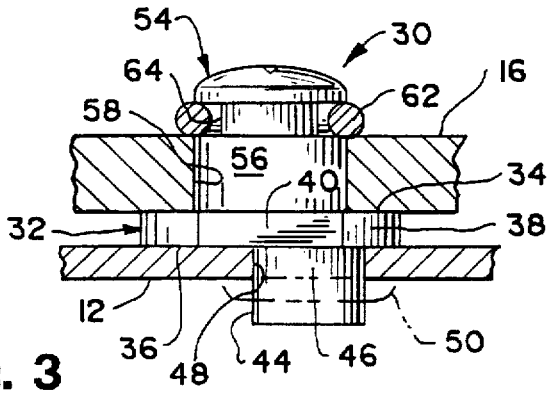
Fig. 3
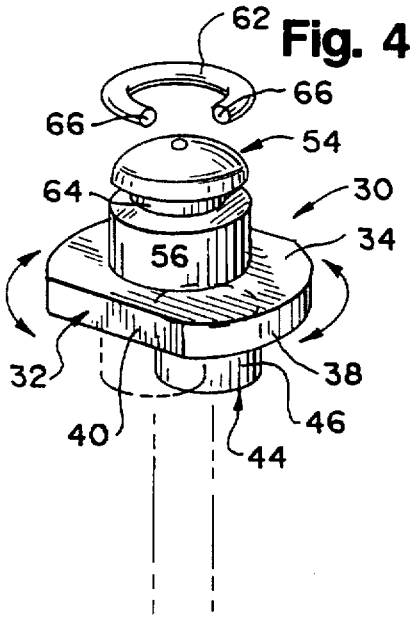
Fig. 4

ADJUSTABLE CASEMENT HINGE

Matter enclosed in heavy brackets [ ] appears in the original patent but forms no part of this reissue specification; matter printed in italics indicates the additions made by reissue.

BACKGROUND OF THE INVENTION

1. Technical Field

The present invention is directed toward casement hinges for windows, and more particularly toward improved track pivots of casement hinges.

2. Background Art

The casement window has a window sash movably mounted within a frame by a pair of hinges mounted between the window frame and the top and bottom of the window sash. It is typical of such a hinge to have a track mountable to the window frame and a sash arm connectable to the window sash. A support arm interconnects the track and the sash arm, with the support arm being pivotally connected to the sash arm and to the track. The sash arm is pivotally connected to a mounting shoe which is supported and guided for movement lengthwise of the track. Window hinges of this type are shown, for example, in Tacheny et al. U.S. Pat. No. 4,726,092 and Sandberg et al. U.S. Pat. No. Re. 32,846 (the latter of which shows a snap stud for defining the pivot which is fixed relative to the track).

A variation on the above described hinge includes an intervening link between the sash arm and the movable shoe to provide for an offset sash arm. Such hinges typically include a second intervening link between the support arm and the movable shoe to provide further support. A window hinge of this type is shown, for example, in Vetter U.S. Pat. No. 4,674,149.

When window hinges of the above type are installed, proper operation and sealing of the window when closed requires that the fixed track pivot (usually between the support arm and the window frame) be properly located relative to the window sash. Further, over the life of the window, the proper location of the fixed track pivot may change due to slight shifting of the window, window frame, etc., resulting in a sag in the sash. Sash sag is a condition formed when the sash and the frame of a window are no longer square to one another (in the closed position), or the edge of the sash which is opposite the hinges seems to sag in comparison to the frame of the window. As a result, the window may not seal tightly or open and close easily.

Heretofore, precise installation of the hinge and later correction of sash sag has usually required that the hinge track be provided with slotted holes and that the hinge mounting screws in the slotted holes be removed to allow for shifting of the track. Repeated removal of such screws can, however, over the life of a window result in a gradual loosening of the strength of the mounting. Further, setting of the frame to properly position the window sash can necessitate that the window be first opened (to allow access to the hinge for adjustment) and then closed (to check the sash alignment). If the adjuster chooses to securely tighten the screws before checking the alignment, subsequent adjustments require that the screws be loosened again, which further exacerbates the potential loss of strength in the mounting. If, instead, the adjuster chooses to check the alignment before securely tightening the screws, then the track can slip when the window is reopened to allow access to the screws for tightening, with the result being that the track once finally tightened might still be slightly misaligned.

The present invention is intended to avoid one or more of the problems discussed above.

SUMMARY OF THE INVENTION

In one aspect of the present invention, a connection for adjustably holding two window hardware members in pivotally connected relationship is provided, including a first hardware member with a first cylindrical opening, a second hardware member with a second cylindrical opening, and a stud. The stud has a flange having two substantially parallel faces and a peripheral surface therebetween, with a rivet portion projecting from one face and a pivot portion projecting from the other face. The rivet portion includes a cylindrical neck extending through the first cylindrical opening and a head on the end of the neck, the flange and the head engaging opposite sides of the first hardware member to frictionally secure the stud against pivoting relative to the track. The pivot portion includes a cylindrical shaft eccentric from the cylindrical neck and extending through the second cylindrical opening, with the second hardware member being secured to the pivot portion for pivoting about the cylindrical shaft. The stud flange peripheral surface is engageable with a tool to allow for adjustment of the pivotal connection by pivoting the stud.

In another aspect of the present invention, the window hardware is a hinge with a sash arm securable to a window sash and supported by a support arm, where the first hardware member is a track securable to a window frame and the second hardware member is a support arm pivotally secured at its other end to the sash arm.

In yet another aspect of the present invention, the second hardware member is secured to the pivot portion by a C-ring disposed in an external peripheral groove in the pivot portion. A part of the C-ring is in the peripheral groove and a part extends radially beyond the pivot portion periphery when the C-ring is in a securing position, and the peripheral groove having a depth to enable deformation of the C-ring by movement of the spaced-apart ends towards each other to a release position in which substantially all of the C-ring is in the peripheral groove.

It is an object of the invention to provide a casement hinge which may be easily and precisely installed.

It is another object of the present invention to provide a casement hinge which will remain securely mounted and thereby minimize any loosening of the hinge over the life of the window.

It is still another object of the present invention to provide a casement hinge which may be easily adjusted over the life of the window to ensure that a tight seal be provided when the window is closed and that the window be easily and smoothly operated at all times.

BRIEF DESCRIPTION OF THE DRAWINGS

FIG. 1 is a plan view showing a window hinge including the adjustable pivot of the present invention;

FIG. 2 is a top view of the stud of the present invention;

FIG. 3 is a side cross-sectional view showing the relationship of the pivot components of the present invention when assembled (with the turned rivet head shown in phantom); and FIG. 4 is a perspective view of the stud and C-ring of the present invention.

DESCRIPTION OF THE PREFERRED EMBODIMENT

A casement hinge 10 embodying the present invention is shown in FIG. 1. The hinge 10 includes a track 12, a sash arm 14, and a support arm 16.

The track 12 includes a number of openings 20 therethrough through which suitable screws (not shown) may be inserted for mounting the track 12 to a window frame. Inasmuch as the present invention does not require shifting of the track 12 as will hereafter become apparent, these track openings 20 may be circular to securely mount the track 12 against any longitudinal movement.

The sash arm 14 includes a number of openings 22 therethrough through which suitable screws (not shown) may be inserted for mounting the sash arm 14 along the side of a window sash (not shown) such that the hinge 10 connects the window sash to the window frame for suitable opening and closing of the window. The sash arm 14 is connected to a shoe 24 on one end by a suitable rivet 26 or the like for pivotal connection therebetween, and at an intermediate location is pivotally connected to one end of the support arm 16 by another suitable rivet 28. The shoe 24 is suitably secured to the track for longitudinal movement along the track 12.

The other end of the support arm 16 is pivotally connected to a point selectively fixed on the track 12 in a manner described in greater detail hereafter.

It will be understood by a person of ordinary skill in this art that the description given above is one type of conventional arrangement for a window casement hinge. Further, once an understanding of the present invention is gained by such persons, it will also be recognized that the invention described hereafter may also be suitably used with other types of hinges (including, for example, hinges in which the sash arm has a fixed pivot relative to the track and the support arm is pivoted to a movable shoe), as well as for various other pivot connections of window hardware where adjustment might be required.

FIGS. 2–4 show the structure for providing the fixed pivot at the end of the support arm 16. Specifically, a stud 30 is provided with a flange 32 having substantially parallel top and bottom faces 34, 36 and a peripheral surface 38 therebetween. The peripheral surface 38 includes opposite flat sides 40 for a purpose which will become apparent hereafter.

A rivet portion 44 projects from the bottom face 36, and includes a cylindrical neck or tenon 46 which extends through a matching cylindrical opening 48 in the track 12. A rivet head 50 (shown in phantom in FIG. 3) is suitably formed on the end of the neck 46 after assembly on the track 12 so that the flange bottom face 36 and the rivet head 50 engage opposite sides of the track 12 to frictionally secure the stud 30 against freely pivoting relative to the track 12.

A pivot portion 54 projects from the flange top face 34, and includes a cylindrical shaft 56 which extends through a matching cylindrical opening 58 in the support arm 16. The pivot portion shaft 56 is offset (i.e., eccentric) from the rivet portion neck 46 for a purpose which will become apparent hereafter. The pivot portion 54 is suitably secured to the support arm 16 to allow relatively free pivoting of the support arm 16.

In the preferred embodiment of the present invention, the support arm is releasably secured to the pivot portion 54 by a C-ring 62 received in an external peripheral groove 64 in the pivot portion 54, such as shown in Sandberg et al. U.S. Pat. No. Re. 32,846, the disclosure of which is hereby incorporated by reference. Specifically, the C-ring 62 is made of substantially incompressible spring-type material such as round spring music wire and extends through more than 180° in the groove. The C-ring 62 has inner and outer diameters selected to have a part in the peripheral groove 64 and a part extending radially beyond the pivot portion 54 periphery when the C-ring 62 is in a securing position (see FIG. 3). Further, the peripheral groove 64 has a depth which enables the C-ring 62 to deform by movement of its spaced-apart ends 66 (see FIG. 4) toward each other so that substantially all of the C-ring 62 may be positioned in the peripheral groove 64 in a release position (allowing the support arm 16 to pass over the C-ring 62, either for assembly or disassembly).

Such a releasable connection provides a number of advantages. For example, such hinges can quickly, easily, inexpensively, and reliably mount a window sash to a window frame by minimizing the time during which the heavy window sash must be support by the installer (the sash arm 14 and track 12 can be separately mounted and then quickly connected to mount the window). Of course, such hinges can also be easily maintained over the life of the window inasmuch as removal for cleaning (and/or replacement when damaged) can similarly be easily accomplished without requiring that the sash be support for long periods of time during replacement. Also, inasmuch as the track 12 is separable from the remainder of the hinge 10, should the arms or pivotal connections become damaged so as to require replacement, this can be accomplished without requiring replacement of the entire hinge 10.

As will be apparent to a person of ordinary skill in this art once an understanding of the present invention is obtained, adjustment of the above described hinge 10 can be simply accomplished. That is, when sag is detected in the supported window sash (whether during initial installation or developing over time), it may be simply corrected by pivoting the stud 30 to effectively move the fixed pivot defied by the stud pivot portion 54 longitudinally along the track 12.

More specifically, by slipping a suitable tool (such as a wrench) between the track 12 and the support arm 16 so as to engage the flat sides 40 of the stud flange 32, a person can develop a sufficient moment arm to overcome the strong static friction forces holding the stud 30 against movement relative to the track 12, and thereby can turn the stud 30 about the axis of the rivet portion 44 to a new position. Once so pivoted, the static friction forces between the rivet head 50, flange bottom face 36, rivet neck 46, and track 12 will once again secure the stud 30 against movement relative to the track 12.

Further, due to the eccentricity of the pivot portion 54 (which defines the axis of pivot of the support arm 16) relative to the rivet portion 44 about which the stud 30 is turned, such operation shifts the pivot portion 54 through an infinite number of positions so as to adjust the support arm pivot axis longitudinally on the track 12 through a range which is twice as long as the eccentricity of the pivot portion 54. In short, this simple turning operation can be used to shift the support arm pivot axis as needed to correct for sag of the supported window sash.

It is thus apparent that hinges embodying the present invention can be easily and precisely installed. Further, such hinges will remain securely mounted so as to minimize undesirable shifting of the fixed pivot over the life of the window. Still further, such hinges may be easily adjusted over the life of the window to correct for such sash sag which might develop to ensure that a tight seal be provided when the window is closed and that the window be easily and smoothly operated at all times.

Still other aspects, objects, and advantages of the present invention can be obtained from a study of the specification, the drawings, and the appended claims.

I claim:

1. A connection for adjustably holding two window hardware members in pivotally connected relationship, said connection comprising:

a first hardware member with a first cylindrical opening;

a second hardware member with a second cylindrical opening at one end;

a stud having a flange having two substantially parallel faces with a peripheral surface therebetween, said peripheral surface including means for engaging *a* pivoting tool, a rivet portion projecting from one face of the stud flange, said rivet portion including a cylindrical neck extending through said first cylindrical opening [an] *and* a head on the end of the neck, said flange and said head engaging opposite sides of said first hardware member to frictionally secure said stud against freely pivoting relative to said first hardware member, a pivot portion projecting from the other face of the stud flange, said pivot portion including a cylindrical shaft eccentric from said cylindrical neck and extending through said second cylindrical opening, and means for securing the second hardware member to the pivot portion for pivoting about the cylindrical shaft.

2. The connection of claim 1, wherein the engaging means comprises two opposing flat sides engageable with a wrench.

3. The connection of claim 1, further comprising a hinge with a sash arm securable to a window sash and pivotally secured to the second hardware member, wherein said first hardware member comprises a track securable to a window frame and said sash arm is pivotally secured at one end to a [show] *shoe* slidable along said track.

4. The connection of claim 1, wherein said securing means comprises an external peripheral groove in said pivot portion and a C-ring of substantially incompressible spring-type material extending through more than 180° and in said groove, said C-ring having inner and outer [diameter] selected to have *diameters* part thereof in said peripheral groove and a part extending radially outwardly beyond the periphery of the pivot portion shaft when the C-ring is in a securing position, and said peripheral groove having a depth to enable deformation of the C-ring by movement of said spaced-apart ends towards each other to a release position in which substantially all of the C-ring is in said peripheral groove.

5. In a casement hinge *having* a track for mounting to a window frame, a sash arm for mounting to a window sash and connected at one end to a first pivot secured to the track, and *a* support arm pivotally connected to the sash arm [to] *at* one end and at the other end to a second pivot secured to the track, one of said first or second pivots being fixed relative to the track, wherein said one pivot comprises:

a first cylindrical opening in said track;

a second cylindrical opening in the arm connected to [he] *the* one pivot;

a stud having a flange having top and a bottom and an outer periphery with two opposing flat sides, a rivet portion extending from the bottom of the stud flange, said rivet portion including a cylindrical neck extending through said first cylindrical opening and a head on the end of the neck, said flange and said head engaging opposite sides of said track to frictionally secure said stud against freely pivoting relative to said track, a pivot portion extending from the top of the stud flange, said pivot portion including a cylindrical shaft eccentric from said cylindrical neck and extending through said second cylindrical opening, and means for securing the connected arm to the pivot portion for pivoting about the cylindrical shaft.

6. The hinge pivot of claim 5, wherein said securing means comprises an external peripheral groove in said pivot portion and a C-ring of substantially incompressible spring-type material extending through more than 180° and in said groove, said C-ring having inner and outer diameters selected to have a part thereof in said peripheral groove and a part extending radially outwardly beyond the periphery of the pivot *portion* shaft when the C-ring is in a securing position, and said peripheral groove having a depth to enable deformation of the C-ring by movement of said spaced-apart ends towards each other to a release position in which substantially all of the C-ring is in said peripheral groove.

7. The hinge pivot of claim 5, wherein said one pivot is said first pivot and said second pivot connects said support arm to a [show] *shoe* secured for movement along said track.

8. The hinge pivot of claim 5, wherein said one pivot is said second pivot and said first pivot connects said sash arm to a shoe secured for movement along said track.

*9. A connection for adjustably holding two window hardware members in pivotally connected relationship, said connection comprising:*

*a first hardware member with a first cylindrical opening;*

*a second hardware member with a second cylindrical opening at one end; and*

*a stud having*

*a flange having two substantially parallel faces,*

*a rivet portion projecting from one face of the stud flange, said rivet portion including a cylindrical neck extending through said first cylindrical opening and a head on the end of the neck, said flange and said head engaging opposite sides of said first hardware member to frictionally secure said stud against freely pivoting relative to said first hardware member,*

*a pivot portion projecting from the other face of the stud flange, said pivot portion including a cylindrical shaft eccentric from said cylindrical neck and extending through said second cylindrical opening,*

*means for securing said second hardware member to said pivot portion for pivoting about said cylindrical shaft, and*

*means engageable by a torque applying tool for turning said stud between frictionally secure positions relative to said first hardware member.*

*10. The connection of claim 9, further comprising a hinge with a sash arm securable to a window sash and pivotally secured to said second hardware member, wherein said first hardware member comprises a track securable to a window frame and said sash arm is pivotally secured at one end to a shoe slidable along said track.*

*11. The connection of claim 9, wherein said securing means comprises an external peripheral groove in said pivot portion and a C-ring of substantially incompressible spring-type material extending through more than 180° and in said groove, said C-ring having inner and outer diameters selected to have part thereof in said peripheral groove and a part extending radially outwardly beyond the periphery of the pivot portion shaft when the C-ring is in a securing position, and said peripheral groove having a depth to*

*enable deformation of the C-ring by movement of said spaced-apart ends towards each other to a release position in which substantially all of the C-ring is in said peripheral groove.*

*12. In a casement hinge, a track for mounting to a window frame, a sash arm for mounting to a window sash and connected at one end to a first pivot secured to the track, and a support arm pivotally connected to the sash arm at one end and at the other end to a second pivot secured to the track, one of said first or second pivots being fixed relative to the track, wherein said one pivot comprises:*

*a first cylindrical opening in said track;*

*a second cylindrical opening in the arm connected to the one pivot; and*

*a stud having*

*a flange having a top and a bottom,*

*a rivet portion extending from the bottom of said stud flange, said rivet portion including a cylindrical neck extending through said first cylindrical opening and a head on the end of the neck, said flange and said head engaging opposite sides of said track to frictionally secure said stud against freely pivoting relative to said track,*

*a pivot portion extending from the top of the stud flange, said pivot portion including a cylindrical shaft eccentric from said cylindrical neck and extending through said second cylindrical opening,*

*means for securing the connected arm to the pivot portion for pivoting about said cylindrical shaft, and*

*means engageable by a torque applying tool for turning said stud between frictionally secure positions relative to said track.*

*13. The hinge pivot of claim 12, wherein said flange includes an outer periphery between said flange top and bottom and said engaging means comprises two opposing flat sides on said outer periphery, said opposing flat sides engageable with a wrench.*

*14. The hinge pivot of claim 12, wherein said securing means comprises an external peripheral groove in said pivot portion and a C-ring of substantially incompressible spring-type material extending through more than 180° and in said groove, said C-ring having inner and outer diameters selected to have a part thereof in said peripheral groove and a part extending radially outwardly beyond the periphery of the pivot shaft when the C-ring is in a securing position, and said peripheral groove having a depth to enable deformation of the C-ring by movement of said spaced-apart ends towards each other to a release position in which substantially all of the C-ring is in said peripheral groove.*

*15. The hinge pivot of claim 12, wherein said one pivot is said first pivot and said second pivot connects said support arm to a shoe secured for movement along said track.*

*16. The hinge pivot of claim 12, wherein said one pivot is said second pivot and said first pivot connects said sash arm to a shoe secured for movement along said track.*

* * * * *